United States Patent
Takeno et al.

(10) Patent No.: US 7,677,399 B2
(45) Date of Patent: Mar. 16, 2010

(54) SEPARATION MEMBRANE AND MANUFACTURING PROCESS THEREOF

(75) Inventors: Shogo Takeno, Nagoya (JP); Akimasa Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 5 days.

(21) Appl. No.: 11/867,188

(22) Filed: Oct. 4, 2007

(65) Prior Publication Data
US 2008/0152865 A1 Jun. 26, 2008

(30) Foreign Application Priority Data
Dec. 25, 2006 (JP) ............... 2006-348036

(51) Int. Cl.
B01D 39/00 (2006.01)
B01D 39/14 (2006.01)
B05D 3/02 (2006.01)
B05D 5/00 (2006.01)

(52) U.S. Cl. ............ 210/500.38; 427/228; 427/244; 427/372.2; 210/510.1

(58) Field of Classification Search ......... 210/321.87, 210/500.21, 500.37, 500.38, 500.39, 634
See application file for complete search history.

(56) References Cited

U.S. PATENT DOCUMENTS

| | | | |
|---|---|---|---|
| 1,891,981 A * | 12/1932 | Herbst | 432/152 |
| 4,260,652 A * | 4/1981 | Taketani et al. | 427/245 |
| 5,937,845 A * | 8/1999 | Gladd, Sr. | 126/21 A |
| 6,767,455 B2 * | 7/2004 | Goldsmith | 210/151 |
| 2007/0026190 A1 | 2/2007 | Baba | |

FOREIGN PATENT DOCUMENTS

| | | |
|---|---|---|
| JP | 05-285929 | 11/1993 |
| JP | 2000-033238 | 2/2000 |
| JP | 2003-286018 | 10/2003 |
| JP | 2004-299966 | 10/2004 |
| JP | 2006-212480 | 8/2006 |

* cited by examiner

Primary Examiner—Krishnan S Menon
Assistant Examiner—Katherine Zalasky
(74) Attorney, Agent, or Firm—Burr & Brown

(57) ABSTRACT

A process for manufacturing a separation membrane with excellent productivity, which can uniformly dry and imidize a separation membrane precursor solution formed on an inner surface of through-holes of a monolith substrate and which does not require complicated operations such as placement of a monolith substrate in a dryer, and the separation membrane manufactured by the process are provided. The separation membrane is manufactured comprising: causing a separation membrane precursor solution to pass through through-holes in a porous monolith substrate, to form a membrane of the precursor solution on the surface of the through-holes, and drying the membrane by causing hot wind to pass through the through-holes.

7 Claims, 3 Drawing Sheets

SEPARATION MEMBRANE AND MANUFACTURING PROCESS THEREOF

BACKGROUND OF THE INVENTION AND RELATED ART

The present invention relates to a separation membrane used for separating specific components from various mixtures and a manufacturing process thereof.

DESCRIPTION OF BACKGROUND ART

In recent years, production of ethanol using biomass technology has attracted attention from the viewpoint of environmental protection and effective use of scrap wood. A process of using selective permeability of a zeolite membrane has been known as a method for collecting ethanol produced by such a biomass technology. According to the process, a liquid mixture containing water and ethanol obtained from woody biomass is brought in contact with a zeolite membrane to cause only water to selectively permeate the membrane.

In addition to water and ethanol, the liquid mixture obtained from woody biomass contains organic acids such as acetic acid. Since a zeolite membrane generally has poor resistance to acids, degradation of separation performance and early deterioration of the membrane due to an organic acid are subject of concern.

For this reason, use of a carbon membrane which has been mainly used for separating specific components from a gas mixture is now being studied for the separation of an organic solvent such as ethanol from water. Since the carbon membrane is more resistant to acids than the zeolite membrane, the carbon membrane exhibits stable separation performance over a long period of time in the presence of an organic acid. As a typical manner of using the carbon membrane in such an application, a porous monolith substrate having through-holes with a carbon membrane provided on the surface is known.

In one example of the method for manufacturing such a carbon membrane, a polyamide acid solution is caused to pass through the through-holes in a porous monolith substrate, to form a polyamide acid film on the surface of the through-holes. The monolith substrate is then put into a dryer to dry the polyamide acid film at about 200° C., and the temperature in the dryer is increased to about 300° C. to obtain a polyimide film by imidizing the polyamide acid. The polyimide film is carbonized by thermal decomposition under an inert atmosphere such as a nitrogen atmosphere to obtain a carbon membrane (for example, refer to Patent Document 1).

However, if the film is dried and imidized by stationary drying in a dryer, a temperature distribution is produced within the monolith substrate during the heat transfer from the outside to the inside of the monolith substrate. Thus, it is difficult to uniformly dry and imidize the entire separation membrane. Uneven drying and imidization adversely affect the separation performance of the resulting carbon membrane. Poor production efficiency due to the labor and time required for placing the monolith substrate in a dryer is another problem.

[Patent Document 1] JP-A-2003-28601.8

SUMMARY OF THE INVENTION

The present invention has been attained in view of these problems and has an object of providing a process for manufacturing a separation membrane with excellent productivity, which can uniformly dry and imidize a separation membrane precursor solution formed on an inner surface of through-holes of a monolith substrate and which does not require complicated operations such as placement of a monolith substrate in a dryer, and of providing the separation membrane manufactured by the process.

The above object is solved in the present invention by the following manufacturing processes of separation membranes and the produced separation membranes.

A process for manufacturing a separation membrane that includes a separation membrane precursor solution to pass through through-holes in a porous monolith substrate, to form a membrane of the precursor solution on the surface of the through-holes, and drying the membrane by causing hot wind to pass through the through-holes.

A dried membrane is preferably carbonized to form a separation membrane by thermal decomposition, after the membrane of the separation membrane precursor solution is formed and then thus formed membrane is dried.

The precursor solution preferably is a polyamide acid solution.

The membrane is preferably dried and imidized by through circulation.

Preferably, hot wind at 50 to 300° C. is caused to pass through the through-holes at a rate of 0.5 to 30 m/s.

The hot wind preferably is caused to pass through the through-holes after preheating the entire monolith substrate or the surface of the through-holes at 50 to 350° C.

The membrane is preferably formed after sealing the outer circumference of the monolith substrate.

A separation membrane manufactured by the process, where, the monolith substrate has preferably a configuration with a cross-section vertical to the longitudinal direction in the shape of a circle or a polygon, an external diameter of 10 to 300 mm, a length of 30 to 2,000 mm, and 1 to 10,000 through-holes formed therethrough.

According to the process of the present invention, a membrane of a separation membrane precursor solution formed on the surface of the through-holes in a monolith substrate is dried by circulated air (hot wind). The membrane is thus dried from the surface which is in contact with the hot wind, while transmitting the heat uniformly to the entire membrane, so that membrane can be uniformly dried as a whole. In addition, since the membrane is dried only by through circulation without using a stationary dryer, a complicated operation requiring time and labor such as placement of the monolith substrate in the dryer is unnecessary. Thus, the process has an improved production efficiency. Furthermore, according to the process of the present invention, the through circulation not only dries the membrane, but can also imidize the membrane. In this instance, the membrane is dried from the surface which is in contact with the circulated air (hot wind), while transmitting the heat uniformly to the entire membrane, so that imidization may occur uniformly throughout the membrane. The separation membrane of the present invention prepared by the above-mentioned process is uniform throughout the entire membrane and exhibits excellent separation performance.

EXPLANATION OF SYMBOLS

1: monolith substrate, 2: membrane of precursor solution, 3: through-hole, 4: drier, 5: container, 6: sealing material, 7: thermostat bath, 8: beaker, 9: feed solution, 10: circulating pump, 11: circulating line, 12: circulating line, 13: circulating line, 14: vacuum pump, 15: pervaporation line, 16: pervaporation line, 17: liquefied nitrogen, 18: cooling trap, 19: thermometer, 20: stirring bar, 21: cooling pipe

DESCRIPTION OF PREFERRED EMBODIMENT

Preferred embodiments of the present invention will now be described. The present invention, however, should not be construed as being limited to these embodiments. Various alterations, modifications, and improvements are possible within the scope of the present invention by a person having an ordinary skill in the art.

The process for manufacturing the separation membrane of the present invention comprises a separation membrane precursor solution to pass through through-holes in a porous monolith substrate, to form a membrane of the precursor solution on the surface of the through-holes, and drying the membrane by through circulation in which hot wind is caused to pass through the through-holes.

"Monolith substrate" in the present invention refers to a substrate with a shape of a lotus root or a honeycomb having through-holes formed in the longitudinal direction. From the viewpoint of hardness and chemical stability, ceramic materials such as alumina, silica, cordierite, mullite, titania, zirconia, and silicon carbide are preferable as the material of the monolith substrate. From the viewpoint of hardness and permeability, the porosity of the substrate is preferably about 25 to 55%. The average pore diameter of the porous substrate is preferably about 0.005 to 5 µm.

As a precursor solution of the separation membrane used for forming the membrane, a polyamide acid solution which is widely used for the production of common separation membranes (carbon membranes) is most preferable. The polyamide acid solution is a solution in which the polyamide acid which is a precursor of the polyimide resin is dissolved in an appropriate organic solvent such as N-methyl-2-pyrrolidone (NMP) or N,N-dimethylacetamide (DMAc). There are no specific limitations to the concentration of the polyamide acid in the polyamide acid solution. In order to prepare a solution with a viscosity which easily form a membrane, a concentration in a range of 1 to 20 mass % is preferable.

Figure 2:
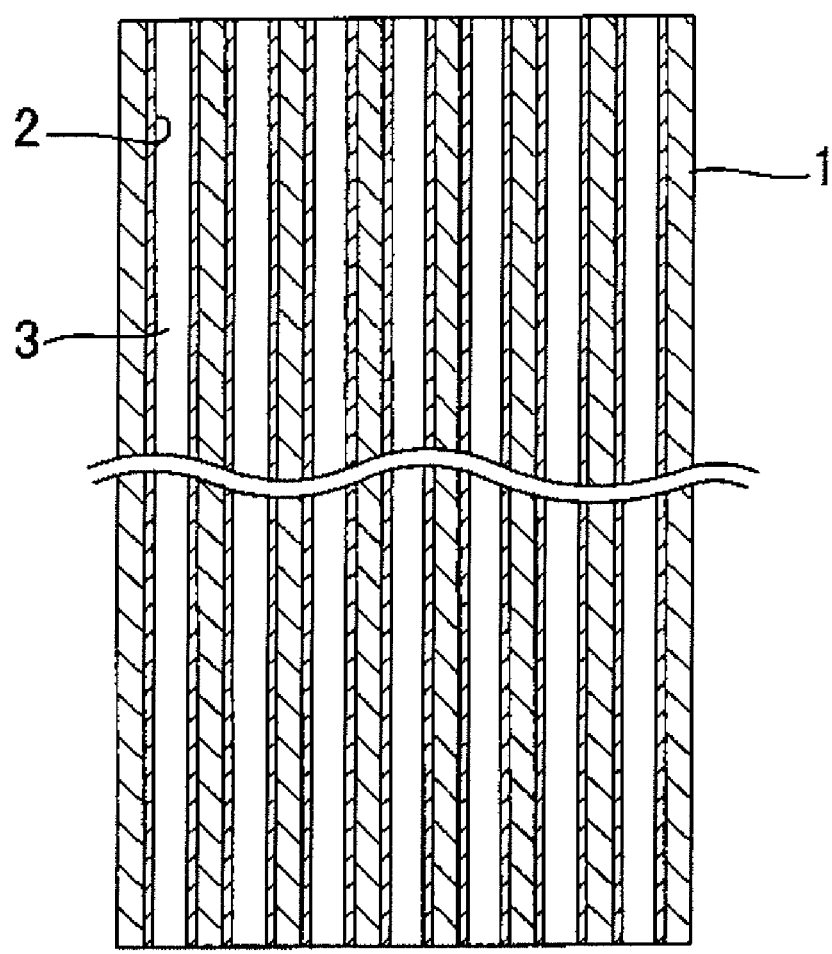
FIG. 2 is a cross-sectional view of a monolith substrate having through-holes with a membrane of a precursor solution formed on the surface thereof.

As a method of causing the precursor solution to pass through the through-holes of a monolith substrate in the step of forming the membrane, a dipping film-forming method comprising feeding the precursor solution to the through-holes from one open end of each through-hole, using a feed pump, at the rate of about 0.3 to 300 cm/min, for example, is preferable. In order to prevent the precursor solution from adhering to areas other than the surface of the through-holes, a method of sealing the outer circumference of the monolith substrate with a seal tape or the like is preferably used. A monolith substrate 1 having through-holes 3 with a membrane 2 of the precursor solution formed on the surface, as shown in FIG. 2, can be obtained by such a method.

In the present invention, the membrane formed from the precursor solution in this way is dried by through circulation. If the membrane made from the precursor solution is dried by through circulation, the membrane can be dried from the surface which is in contact with circulated air (hot wind), while transmitting the heat uniformly to the entire membrane, so that membrane can be uniformly dried as a whole.

In the present invention, the through circulation drying not only dries, but also can imidize the membrane formed from the precursor solution. When the precursor solution is a polyamide acid solution, for example, since the imidization reaction of the polyamide acid requires heating at 200° C. or more, in order to imidize the polyamide acid along with drying of the membrane (polyamide acid membrane) made from the polyamide acid solution, it is preferable to include a time zone during which the through circulation drying is carried out by circulating hot wind at a temperature of 200 to 300° C. For example, after drying the polyamide acid membrane for about one hour at a circulation gas temperature of about 150° C., the gas temperature is increased to about 250° C., at which the membrane is heated for about 15 minutes to imidize the polyamide acid.

Such imidization by through circulation drying ensures uniform transmission of the heat from the surface which is in contact with the heated circulation air (hot wind) to the entire membrane, and the membrane is imidized uniformly. The polyamide acid membrane is converted into a polyimide membrane which is a precursor of the separation membrane (carbon membrane) by imidization in this manner.

Figure 1:
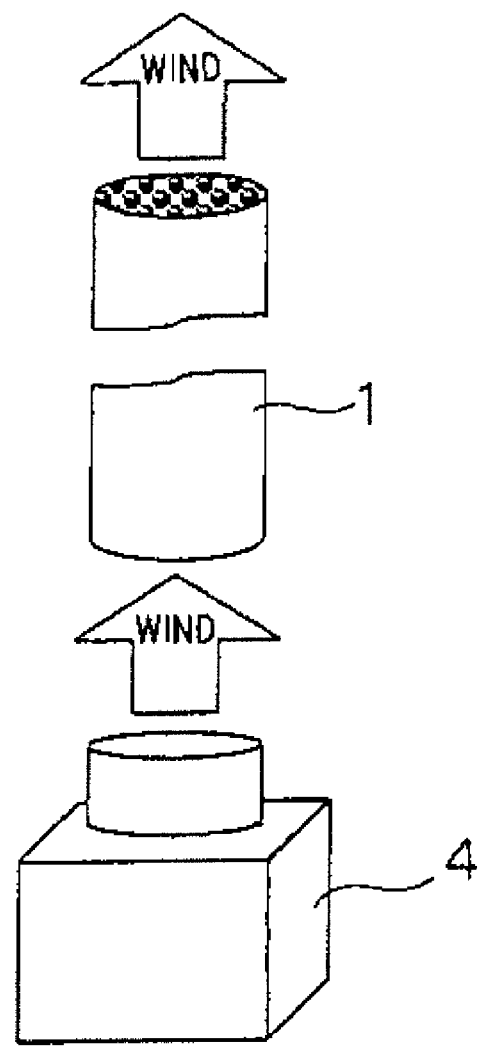
FIG. 1 is an explanatory diagram showing an through circulation method used in the present invention.

FIG. 1 is an explanatory diagram showing a method of through circulation drying used in the present invention. In this example, a dryer 4 is disposed at one end of a monolith substrate 1, and circulation air (hot wind), which is heated to a specified temperature and discharged from the dryer 4, is sent to a through-hole from one open end of the through-hole. The circulation air is discharged from the through-hole opening at the other open end of the monolith substrate 1. By causing the circulation air to pass through the through-hole in this manner, it is possible to uniformly heat the entire membrane of polyamide acid or the like formed from the precursor solution on the surface of the through-hole, and to uniformly dry and imidize the membrane from the surface. When a desired membrane thickness cannot be obtained by one film-forming and drying operation, the film-forming and drying operation may be repeated until a separation membrane with the desired thickness is obtained.

The temperature of the circulation air (hot wind) to be passed through the through-holes is preferably 50 to 300° C., more preferably 100 to 200° C., and still preferably 110 to 190° C. If the temperature of the circulation air is less than 50° C., the drying speed is slow; if more than 300° C., the membrane may be burnt during a long-time drying operation. The flow rate of the circulation air (the speed when passing through the through-hole) is preferably 0.5 to 30 m/s, more preferably 1 to 15 m/s, and still more preferably 5 to 10 m/s. If the flow rate of the circulation air is less than 0.5 m/s, drying and imidization may not be uniform; if more than 30 m/s, the solution may migrate and film-forming may become uneven.

In the present invention, the film-forming is preferably carried out after preheating the entire monolith substrate or the surface of the through-hole in the monolith substrate on which the membrane of the precursor solution is formed at 50 to 350° C. Such preheating accelerates the speed of drying by through circulation and improves separation performance and the like of the resulting separation membrane.

When the precursor solution is a polyamide acid solution, the polyimide membrane obtained by forming and drying the separation membrane, and imidizing polyamide acid is subjected to heat decomposition at a temperature in a range of about 400 to 1,000° C. under vacuum or under a inert atmosphere such as a nitrogen atmosphere or an argon atmosphere to carbonize, thereby obtaining a separation membrane (a carbon membrane). Generally, if carbonization is carried out at a temperature below 400° C., the polyimide membrane will not be sufficiently carbonized, resulting in a membrane with insufficient selectivity and only a poor permeation rate as a molecular-sieve membrane. If the temperature is more than 1,000° C., on the other hand, the permeation rate decreases due to shrinkage of pores.

The thickness of the resulting separation membrane is preferably 0.1 to 10 μm, and more preferably 0.1 to 3 μm. If the thickness of the separation membrane is less than 0.1 μm, it may be difficult for the membrane to attain sufficient selectivity; if more than 10 μm, the permeation rate may be too low.

The application of the separation membrane produced by the present invention is not particularly limited. Since the membrane exhibits high separation performance when used for separating water from ethanol, the separation membrane is suitably used for separating water from ethanol to recover the ethanol from a water/ethanol liquid mixture obtained from biomass.

The separation membrane of the present invention is prepared using a monolith substrate having a configuration with a cross-section vertical to the longitudinal direction in the shape of a circle or a polygon, an external diameter of 10 to 300 mm, a length of 30 to 2,000 mm, and 1 to 10,000 through-holes formed therethrough. The separation membrane prepared by the above-mentioned process of the present invention is uniform throughout the entire membrane and exhibits excellent separation performance.

Taking ease of manufacture into consideration, a monolith substrate having a configuration with a cross-section vertical to the longitudinal direction in the shape of a circle or a polygon is used for manufacturing the separation membrane of the present invention. In addition, the external diameter of the entire monolith substrate is set at 10 to 300 mm, preferably 20 to 250 mm, and still more preferably 30 to 200 mm. If the overall external diameter of the monolith substrate is less than 10 mm, the number of through-holes decreases; if more than 300 mm, on the other hand, it is difficult to manufacture the separation membrane. The length of the monolith substrate is set to 30 to 2,000 mm, preferably 100 to 1,700 mm, and still more preferably 200 to 1,500 mm. If the length is less than 30 mm, the area of the separation membrane is small; if more than 2,000 mm, the manufacture and handling are difficult. Taking the area of the membrane per unit volume and strength into consideration, the number of through-holes is set at 1 to 10,000, preferably 10 to 5,000, and still more preferably 30 to 2,000. If the number of through-holes is more than 10,000, it is difficult to manufacture the separation membrane.

EXAMPLES

The present invention is described below in more detail by way of examples. Note that the present invention is not limited to the following examples.

Example 1

A seal tape was wound around the outer circumference of a porous monolith substrate made of alumina. The monolith substrate was disposed in a manner so that the axes of the through-holes provided therein are in the vertical direction. A polyamide solution with a polyamide acid concentration of 10 mass % in N-methyl-2-pyrrolidone (NMP) used as a solvent ("U-varnish-A" (trade name) manufactured by Ube Industries, Ltd.) was fed to the through-holes from one open end of each through-hole at a rate of 1 cm/min using a feed pump, thereby forming a polyamide acid membrane on the surface of the through-holes. Hot wind at 150° C. was caused to pass through the through-holes from the open end at the lower side to the open end at the upper side for 70 minutes at a rate of 10 m/s using a drier. Then, after increasing the temperature to 250° C., the hot wind was fed for 15 minutes, thereby drying and imidizing the polyamide acid membrane. After repeating this step three times, the monolith substrate was treated with heat at 800° C. in a vacuum box kiln to carbonize the polyimide membrane obtained by the imidization, thereby obtaining a separation membrane (carbon membrane) with a thickness of about 1 μm. Both sides of the monolith substrate having through-holes with a separation membrane formed on the surface were sealed with silicone, and the performance of the separation membrane was evaluated by an pervaporation test. The results are shown pervaporation test in Table 1.

Figure 3:
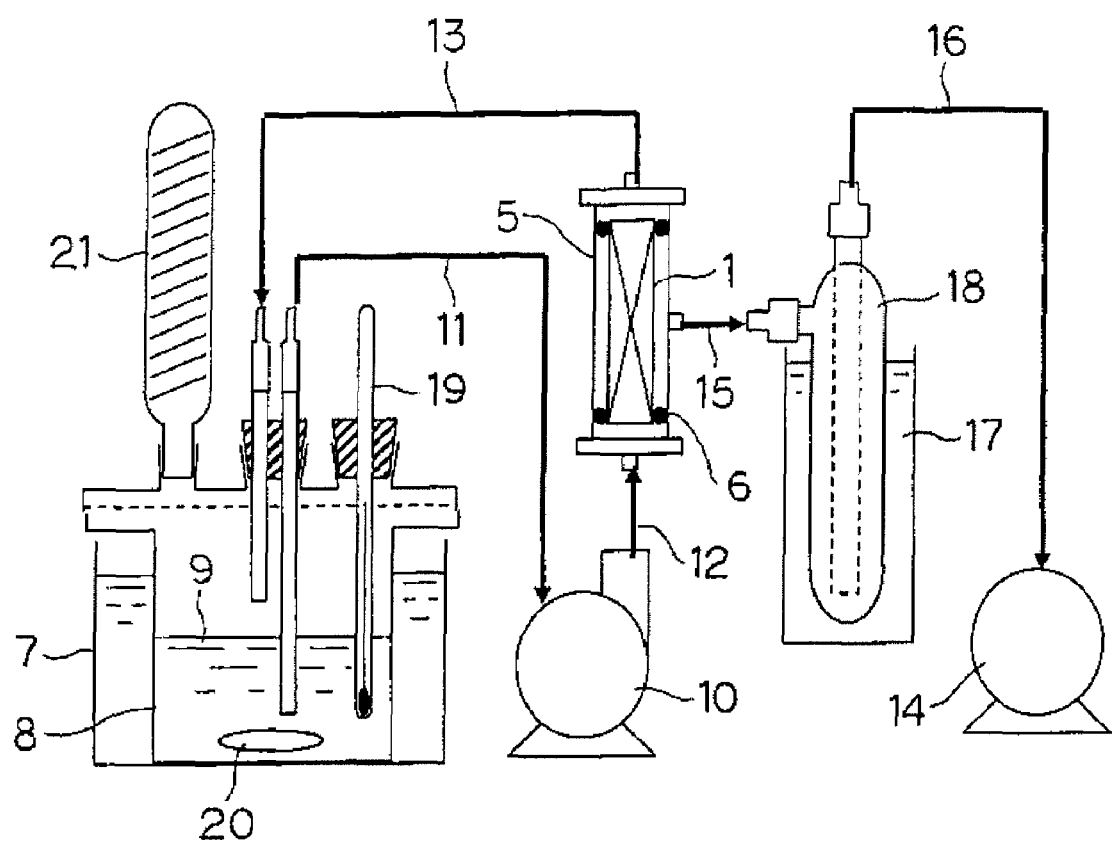
FIG. 3 is a schematic diagram of an pervaporation apparatus used for the evaluation of water/ethanol separation performance in examples.

The separation performance of the membrane was evaluated in the following manner using an pervaporation apparatus shown in FIG. 3. A monolith substrate 1 on which the separation membrane had been formed was placed in a cylindrical container 5. The clearance between the inner circumference of the container 5 and the monolith substrate 1 was sealed around the outer circumference of both ends of the monolith substrate 1 with a sealing material 6. A feed solution 9 warmed to a predetermined temperature in a beaker 8 disposed in a thermostat bath 7 was circulated through circulating lines 11 to 13 using a circulating pump 10 to cause the feed solution 9 to pass through the through-holes of the monolith substrate 1 located in the container 5, which was placed in the circulating line. In this way, while causing the feed solution 9 to come in contact with the separation membrane formed on the surface of the through-holes of the monolith substrate 1, vapor was suctioned off from the permeation side, that is outside, of the monolith substrate 1 using a vacuum pump 14 to a pressure of 0.1 torr or less through pervaporation lines 15 and 16. The vapor permeating the separation membrane was trapped as a permeated solution by a cold trap 18 which was soaked in liquefied nitrogen 17 on the pervaporation line. In the drawing, reference number 19 is a thermometer to measure the temperature of the feed solution 9, reference number 20 is a stirring bar for stirring the feed solution 9, and reference number 21 is a cooling pipe installed on the beaker 8. The water/ethanol separation performance of the separation membrane was evaluated using a water/ethanol mixed solution with a ratio by mass of water to ethanol of 10:90 at a temperature of 75° C. as the feed solution 9. For evaluating the separation performance, the water/ethanol separation factor α shown by the following formula (I) and the permeation flow rate (Flux (kg/m$^2$·h)) shown by the following formula (II) were used. The separation factor is defined as the ratio of the permeation side liquid composition to the supply side liquid composition. Perm (water) and Perm (ethanol) in the formula (I) respectively indicate the concentration by volume of water and ethanol (vol %) permeating the membrane. Feed (water) and Feed (ethanol) in the formula (I) respectively indicate the concentration by volume of water and ethanol (vol %) in the feed solution.

$$\alpha = (\text{Perm(water)}/\text{Perm(ethanol)})/\text{Feed(water)}/\text{Feed(ethanol)}) \qquad (I)$$

$$\text{Flux} = Q/(A \cdot t) \qquad (II)$$

wherein Q is the mass of the permeated solution (kg), A is the area of the separation membrane (m$^2$), and t is the time (h).

Comparative Example 1

In the same manner as in Example 1, a polyamide acid membrane was formed on the surface of the through-holes of a monolith substrate. The monolith substrate was placed in a dryer in such a manner that the bottom surface was not plugged, and dried at 200° C. for 19 hours by stationary drying. After repeating the above step three times, the temperature in the dryer was increased to 300° C. and heating was continued for a further one hour to imidize the polyamide acid membrane. Next, the monolith substrate was treated with heat at 800° C. in a vacuum box kiln to carbonize the polyimide membrane obtained by the imidization, thereby obtaining a separation membrane (carbon membrane) with a thickness of about 1 μm. Both ends of the monolith substrate having through-holes with a separation membrane formed on the surface were sealed with silicone, and the performance of the separation membrane was evaluated by a pervaporation test in the same manner as in Example 1. The results are shown in Table 1.

Comparative Example 2

In the same manner as in Example 1, a polyamide acid membrane was formed on the surface of the through-holes of a monolith substrate. Hot wind at 150° C. was caused to pass through the through-holes from the open end at the lower side to the open end at the upper side for 70 minutes at a rate of 10 m/s using a drier. The monolith substrate was placed in a dryer in such a manner that the bottom surface was not plugged, and dried at 200° C. for 16 hours by stationary drying. After repeating the above step three times, the temperature in the dryer was increased to 300° C. and heating was continued for a further one hour to imidize the polyamide acid membrane. Next, the monolith substrate was treated with heat at 800° C. in a vacuum box kiln to carbonize the polyimide membrane obtained by the imidization, thereby obtaining a separation membrane (carbon membrane) with a thickness of about 1 μm. Both ends of the monolith substrate having through-holes with a separation membrane formed on the surface were sealed with silicone, and the performance of the separation membrane was evaluated by a pervaporation test in the same manner as in Example 1. The results are shown in Table 1.

TABLE 1

|  | Separation performance | |
| --- | --- | --- |
|  | Separation factor α | Flux |
| Example 1 | 200 | 0.9 kg/m$^2$ · h |
| Comparative Example 1 | 30 | 0.3 kg/m$^2$ · h |
| Comparative Example 2 | 100 | 0.7 kg/m$^2$ · h |

As shown in Table 1, the separation membrane obtained in Example 1 in which drying by through circulation was employed in all of the drying steps of polyamide acid membrane showed a higher separation performance than the separation membranes obtained in Comparative Example 1 and Comparative Example 2 in which stationary drying in a drier was employed in all or part of the drying steps of the polyamide acid membrane.

Example 2

Study of Temperature and Flow Rate of Circulation Air

Separation membranes (carbon membranes) were formed in the same manner as in Example 1, except that the temperature and flow rate of the circulation gas during drying were changed as shown in Table 2. Both sides of the monolith substrate having a separation membrane formed on the surface were sealed with silicone, and the performance of the separation membrane was evaluated by a pervaporation examination in the same manner as in Example 1. The results are shown in Table 2. Beside the temperature and flow rate of the circulation gas, the same conditions as in Example 1 were employed for forming the separation membranes.

TABLE 2

| Flow rate | 30° C. | 50° C. | 100° C. | 150° C. | 200° C. | 250° C. | 300° C. | 350° C. |
| --- | --- | --- | --- | --- | --- | --- | --- | --- |
| 0.1 m/s | Separation factor α: 15<br>Flux: 0.3 kg/m$^2$ · h | Separation factor α: 10<br>Flux: 0.3 kg/m$^2$ · h | Separation factor α: 20<br>Flux: 0.3 kg/m$^2$ · h | Separation factor α: 25<br>Flux: 0.4 kg/m$^2$ · h | Separation factor α: 30<br>Flux: 0.3 kg/m$^2$ · h | Separation factor α: 30<br>Flux: 0.4 kg/m$^2$ · h | Separation factor α: 15<br>Flux: 0.3 kg/m$^2$ · h | Separation factor α: 15<br>Flux: 0.4 kg/m$^2$ · h |
| 0.5 m/s | Separation factor α: 15<br>Flux: 0.3 kg/m$^2$ · h | Separation factor α: 140<br>Flux: 0.7 kg/m$^2$ · h | Separation factor α: 150<br>Flux: 0.8 kg/m$^2$ · h | Separation factor α: 170<br>Flux: 0.8 kg/m$^2$ · h | Separation factor α: 180<br>Flux: 0.9 kg/m$^2$ · h | Separation factor α: 190<br>Flux: 0.8 kg/m$^2$ · h | Separation factor α: 170<br>Flux: 0.8 kg/m$^2$ · h | Separation factor α: 25<br>Flux: 0.5 kg/m$^2$ · h |
| 5 m/s | Separation factor α: 20<br>Flux: 0.5 kg/m$^2$ · h | Separation factor α: 170<br>Flux: 0.8 kg/m$^2$ · h | Separation factor α: 180<br>Flux: 0.9 kg/m$^2$ · h | Separation factor α: 220<br>Flux: 0.9 kg/m$^2$ · h | Separation factor α: 200<br>Flux: 0.9 kg/m$^2$ · h | Separation factor α: 200<br>Flux: 0.9 kg/m$^2$ · h | Separation factor α: 190<br>Flux: 0.9 kg/m$^2$ · h | Separation factor α: 20<br>Flux: 0.9 kg/m$^2$ · h |
| 10 m/s | Separation factor α: 20<br>Flux: 0.6 kg/m$^2$ · h | Separation factor α: 180<br>Flux: 0.8 kg/m$^2$ · h | Separation factor α: 180<br>Flux: 0.9 kg/m$^2$ · h | Separation factor α: 200<br>Flux: 0.9 kg/m$^2$ · h | Separation factor α: 210<br>Flux: 0.9 kg/m$^2$ · h | Separation factor α: 200<br>Flux: 0.9 kg/m$^2$ · h | Separation factor α: 190<br>Flux: 0.9 kg/m$^2$ · h | Separation factor α: 25<br>Flux: 0.9 kg/m$^2$ · h |
| 20 m/s | Separation factor α: 20<br>Flux: 0.5 kg/m$^2$ · h | Separation factor α: 180<br>Flux: 0.8 kg/m$^2$ · h | Separation factor α: 170<br>Flux: 0.9 kg/m$^2$ · h | Separation factor α: 200<br>Flux: 0.9 kg/m$^2$ · h | Separation factor α: 190<br>Flux: 0.9 kg/m$^2$ · h | Separation factor α: 200<br>Flux: 0.9 kg/m$^2$ · h | Separation factor α: 200<br>Flux: 0.9 kg/m$^2$ · h | Separation factor α: 20<br>Flux: 0.9 kg/m$^2$ · h |
| 30 m/s | Separation factor α: 20<br>Flux: 0.5 kg/m$^2$ · h | Separation factor α: 180<br>Flux: 0.8 kg/m$^2$ · h | Separation factor α: 170<br>Flux: 0.9 kg/m$^2$ · h | Separation factor α: 200<br>Flux: 0.9 kg/m$^2$ · h | Separation factor α: 200<br>Flux: 0.9 kg/m$^2$ · h | Separation factor α: 180<br>Flux: 0.9 kg/in$^2$ · h | Separation factor α: 180<br>Flux: 0.9 kg/m$^2$ · h | Separation factor α: 25<br>Flux: 0.9 kg/m$^2$ · h |

TABLE 2-continued

| | Temperature | | | | | | | |
|---|---|---|---|---|---|---|---|---|
| Flow rate | 30° C. | 50° C. | 100° C. | 150° C. | 200° C. | 250° C. | 300° C. | 350° C. |
| 40 m/s | Separation factor α: 5 Flux: 0.5 kg/m²·h | Separation factor α: 30 Flux: 0.6 kg/m²·h | Separation factor α: 40 Flux: 0.9 kg/m²·h | Separation factor α: 45 Flux: 1.0 kg/m²·h | Separation factor α: 50 Flux: 1.1 kg/m²·h | Separation factor α: 50 Flux: 1.0 kg/m²·h | Separation factor α: 40 Flux: 0.8 kg/m²·h | Separation factor α: 35 Flux: 0.8 kg/m²·h |

As shown in Table 2, the separation membranes obtained by drying with a circulation gas at a temperature of 50 to 300° C. and a flow rate of 0.5 to 30 m/s exhibited a particularly high separation performance.

Example 3

Separation membranes (carbon membranes) were formed in the same manner as in Example 1, except that the surface of the through-holes was heated at 150° C. by causing hot wind at 150° C. to pass through the through-holes for 10 minutes by using a drier, before forming a polyamide acid membrane on the surface of the through-holes in the monolith substrate. Both ends of the monolith substrate in which the separation membrane was formed were sealed with silicone, and the separation performance of the membranes was evaluated by the pervaporation test in the same manner as in Example 1. The results are shown in Table 3.

Example 4

Separation membranes (carbon membranes) were formed in the same manner as in Example 1, except that the entire monolith substrate was heated at 150° C. by using a drier, before forming a polyamide acid membrane on the surface of the through-holes in the monolith substrate. Both ends of the monolith substrate in which the separation membrane was formed were sealed with silicone, and the separation performance of the membranes was evaluated by the pervaporation test in the same manner as in Example 1. The results are shown in Table 3.

TABLE 3

| | Separation performance | |
|---|---|---|
| | Separation factor α | Flux |
| Example 1 | 200 | 0.9 kg/m²·h |
| Example 3 | 1,200 | 1.1 kg/m²·h |
| Example 4 | 550 | 1.0 kg/m²·h |

As shown in Table 3, the separation membranes obtained in Example 3 and Example 4, in which the membrane was formed after heating the surface of the through-holes of the monolith substrate or the entire monolith substrate at 150° C., showed a higher separation performance than the separation membrane of Example 1 which was not subjected to such a preheating treatment.

Example 5

Study of Preheating Temperature

Separation membranes (carbon membranes) were formed in the same manner as in Example 1, except that the entire monolith substrate was heated at various temperatures as shown in Table 4 by using a drier, before forming a polyamide acid membrane on the surface of the through-holes in the monolith substrate. Both ends of the monolith substrate in which the separation membrane was formed were sealed with silicone, and the separation performance of the membranes was evaluated by the pervaporation test in the same manner as in Example 1. The results are shown in Table 4.

TABLE 4

| | Separation performance | |
|---|---|---|
| Temperature | Separation factor α | Flux |
| 30° C. | 25 | 0.6 kg/m²·h |
| 50° C. | 280 | 0.9 kg/m²·h |
| 100° C. | 350 | 0.9 kg/m²·h |
| 150° C. | 550 | 1.0 kg/m²·h |
| 200° C. | 550 | 1.0 kg/m²·h |
| 250° C. | 500 | 1.0 kg/m²·h |
| 300° C. | 380 | 0.9 kg/m²·h |
| 350° C. | 370 | 0.9 kg/m²·h |
| 400° C. | 90 | 0.9 kg/m²·h |

As shown in Table 4, the separation membranes prepared after preheating the monolith substrate at 50 to 350° C. showed a higher separation performance.

The present invention can be used suitably for manufacturing a separation membrane which is used for separating various mixtures in the biomass field, such as separation of water from ethanol.

The invention claimed is:

1. A process for manufacturing a separation membrane comprising:
    sealing the outer circumference of a porous monolith substrate; and
    passing a separation membrane precursor solution through through-holes in the porous monolith substrate to form a membrane of the precursor solution on the surface of the through-holes; and
    disposing a dryer to an open end of the porous monolith substrate and passing 50° C. to 300° C. wind through the through-holes at a rate of 0.5 to 30 m/s to form a dried membrane on the surface of the through-holes.

2. The process according to claim 1, further comprising carbonizing the dried membrane to form a separation membrane by thermal decomposition.

3. The process according to claim 1, wherein the precursor solution is a polyamide acid solution.

4. The process according to claim 2, wherein the precursor solution is a polyamide acid solution.

5. The process according to claim 1, wherein the membrane is dried and imidized by through circulation.

6. The process according to claim 1, wherein the wind is passed through the through-holes after preheating the entire monolith substrate or the surface of the though-holes at 50 to 350° C.

7. A separation membrane manufactured by the process according to claim 1, wherein the monolith substrate has a configuration with a cross-section vertical to the longitudinal direction in the shape of a circle or a polygon, an external diameter of 10 to 300 mm, a length of 30 to 2,000 mm, and 1 to 10,000 through-holes formed therethrough.

* * * * *